(12) United States Patent
Wei et al.

(10) Patent No.: US 10,712,022 B2
(45) Date of Patent: Jul. 14, 2020

(54) CONSTANT PRESSURE SWITCH APPARATUS AND WATER HEATING SYSTEM

(71) Applicant: A. O. Smith Corporation, Milwaukee, WI (US)

(72) Inventors: Aiguo Wei, Nanjing (CN); Chengjun Zhang, Nanjing (CN); Ziwen Fu, Nanjing (CN)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 15/955,907

(22) Filed: Apr. 18, 2018

(65) Prior Publication Data
US 2018/0238562 A1    Aug. 23, 2018

Related U.S. Application Data

(63) Continuation of application No. PCT/CN2016/099431, filed on Sep. 20, 2016.

(30) Foreign Application Priority Data

Oct. 20, 2015  (CN) .......................... 2015 1 0685827
Feb. 4, 2016   (CN) ..................... 2016 2 0115000 U

(51) Int. Cl.
*F16K 31/08*   (2006.01)
*F24D 19/10*   (2006.01)
(Continued)

(52) U.S. Cl.
CPC ........ *F24D 19/1051* (2013.01); *F16K 15/023* (2013.01); *F16K 15/03* (2013.01);
(Continued)

(58) Field of Classification Search
CPC ............. F24D 19/1051; F24D 17/0078; F16K 31/084; F24H 9/12
See application file for complete search history.

(56) References Cited

U.S. PATENT DOCUMENTS 3,890,968 A  *  6/1975  Pierce ................. A61M 5/1684
                                                       604/65
4,293,001 A  *  10/1981  Budzich ................ F15B 11/165
                                                       137/596.1
(Continued)

FOREIGN PATENT DOCUMENTS

CN      101354086 A      1/2009
CN      201326548 Y     10/2009
(Continued)

OTHER PUBLICATIONS

Chinese Patent Office Action and Search Report for Application No. 201510685827.5 dated May 30, 2016 (12 pages, English translation included).

(Continued)

*Primary Examiner* — Gregory A Wilson
(74) *Attorney, Agent, or Firm* — Michael Best & Friedrich LLP

(57) ABSTRACT

The present application relates to a constant pressure switch apparatus and a water heating system. The constant pressure switch apparatus includes: a body inside which a flow passage is provided, the flow passage having an inlet and an outlet; a first blocking member and an attraction member that can be magnetically attracted to each other; the first blocking member having a blocking position and a communicating position that are spaced apart at a preset distance; the first blocking member being able to move towards the communicating position when a pressure difference between both sides of the first blocking member in a direction from the inlet to the outlet is greater than an attraction force (Continued)

between the first blocking member and the attraction member; and the first blocking member being able to move towards the blocking position when a pressure difference between both sides of the first blocking member in a direction from the inlet to the outlet is less than an attraction force between the first blocking member and the attraction member. The constant pressure switch apparatus and water heating system provided in this application can enable the circulating pump to maintain a connected state of the flow passage without increasing pressure, and can also avoid the problem of series flow of cold and hot water.

29 Claims, 5 Drawing Sheets

(51) Int. Cl.
*F24D 17/00* (2006.01)
*F24H 9/12* (2006.01)
*F16K 15/03* (2006.01)
*F16K 15/02* (2006.01)

(52) U.S. Cl.
CPC ........ *F16K 31/084* (2013.01); *F24D 17/0078* (2013.01); *F24H 9/12* (2013.01)

(56) References Cited

U.S. PATENT DOCUMENTS

| | | | |
|---|---|---|---|
| 5,304,757 A * | 4/1994 | Hensel | G01M 3/3272 200/82 E |
| 9,145,888 B2 * | 9/2015 | Hoshino | F04B 11/0091 |
| 9,320,882 B2 * | 4/2016 | McDaniel | F16K 27/0227 |
| 9,845,898 B1 * | 12/2017 | Johnson | F16K 17/02 |
| 9,845,899 B2 * | 12/2017 | Graichen | F16K 31/1221 |
| 2012/0286187 A1 * | 11/2012 | Spolski | F16L 37/34 251/367 |
| 2014/0097256 A1 | 4/2014 | Yang | |
| 2015/0377497 A1 * | 12/2015 | Haws | F24D 17/0078 137/337 |
| 2017/0182306 A1 * | 6/2017 | Swantner | A61M 39/10 |
| 2018/0017287 A1 * | 1/2018 | Wan | F24H 9/0015 |

FOREIGN PATENT DOCUMENTS

| | | |
|---|---|---|
| CN | 201636410 U | 11/2010 |
| CN | 204313377 U | 5/2015 |
| CN | 204478497 U | 7/2015 |
| CN | 105202771 A | 12/2015 |
| CN | 205060927 U | 3/2016 |
| CN | 205090627 U | 3/2016 |
| CN | 205332549 U | 6/2016 |
| JP | H08235983 A | 9/1996 |
| KR | 100721700 B1 | 1/2007 |
| WO | 2017067362 A1 | 4/2017 |

OTHER PUBLICATIONS

Chinese Patent Office Action and Search Report for Application No. 201510685827.5 dated Oct. 8, 2016 (11 pages, English translation included).
International Search Report and Written Opinion for Application No. PCT/CN2016/099431 dated Nov. 22, 2016 (21 pages, English translation included).
Canadian Patent Office Action for Application No. 3,001,747 dated Mar. 12, 2019 (3 pages).

* cited by examiner

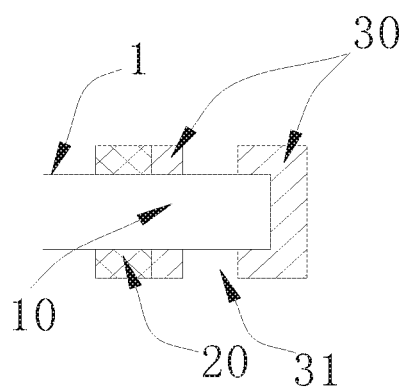
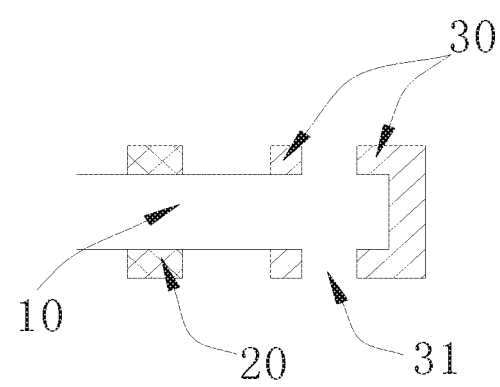
Fig. 5aFig. 5b
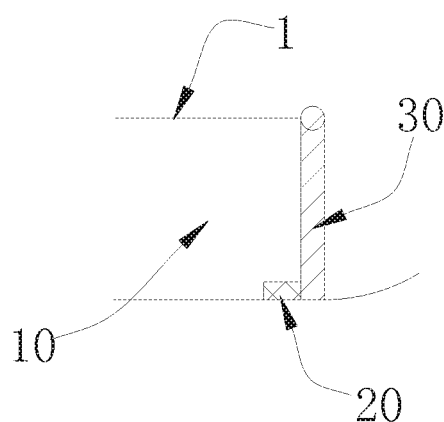
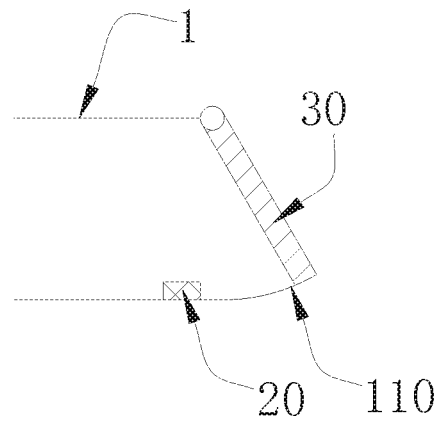
Fig. 6aFig. 6b

CONSTANT PRESSURE SWITCH APPARATUS AND WATER HEATING SYSTEM

TECHNICAL FIELD

The present application relates to the technical field of a water heater, in particular relates to a constant pressure switch apparatus and a water heating system.

BACKGROUND TECHNOLOGY

Water heater has become one of the necessary household equipments, which can provide not only hot water for bath but also hot water for use in kitchen. However, no matter how the water heater is mounted, there is generally a water pipe between the water heater and each water consuming point. When there is no water demand at the water consuming point for a long time, the hot water in the water pipe will gradually cool down, and at the next time when there is a water demand at the water consuming point, especially at the time of the next bath, the water coming out first is the cold water. This not only causes great waste of water resources, but also brings uncomfortable bathing experience to the user. According to an estimation of investigations, in a residential building of ten floors, the length of the above mentioned pipeline is more than 5 meters in average. Take the diameter of the pipeline as 20 mm, the cold water discharged before having a bath each time by each household is about 1.6 litres. If each household uses the gas water heater for twice every day in average, then the water wasted by one household every year is about 1150 litres. If the whole residential building has 300 households, then the total amount of water wasted in one year reaches up to 345 tons.

In order to improve the degree of comfort of bathing for users while saving water resources, the researchers have tried to develop a technique of preheating and circulating the cold water in the pipeline using a circulating pump. The relevant prior art discloses a water heating system, which adds a circulating pump and a return pipeline inside the water heater, and thereby pumps the cooled water in the pipeline connecting the water consuming point and the water heater back to the water heater to be preheated, and in this way, the user can use hot water in time at the water consuming point. In the water heating system, a one-way valve is provided between the return pipeline and the hot water pipeline. In a case of normal water use, the one-way valve is in an off state, and only when the circulating pump is started to perform the preheating and circulation, the one-way valve is opened to communicate the return pipeline with the hot water pipeline, so as to finish the cyclic heating.

However, at present, the employed one-way valve usually uses a spring as a reset mechanism. When the water heater controls the circulating pump to open the one-way valve with a certain initial pressure, the spring will generally be compressed, and thus the resilience acting on a blocking mechanism will increase. In order to prevent the problem of pressure relief springback formed after the one-way valve is opened, the circulating pump needs to increase the pressure constantly to maintain the open state of the one-way valve, so as to ensure a stable return water circulation, and this has a high requirement for the circulating pump.

Besides, some times the water pressures of the cold water pipeline and the hot water pipeline will have fluctuations, which cause a situation where the pressure difference between two sides of the one-way valve is greater than its initial open pressure. Even if the pressure difference is maintained for a short time, the above one-way valve will still be opened in this case, which will cause cold and hot water to form series flow, resulting in a waste of heat energy.

SUMMARY

In view of the deficiencies of the prior art, the present application provides a constant pressure switch apparatus and a water heating system, so as to solve at least one of the above technical problems.

In order to achieve the above purpose, the present application provides a constant pressure switch apparatus, comprising: a first body inside which a flow passage is provided, the flow passage having an inlet and an outlet; a first blocking member and an attraction member that can be magnetically attracted to each other; the first blocking member having a blocking position and a communicating position that are spaced apart with a preset distance; the first blocking member being able to move towards the communicating position when a pressure difference between both sides of the first blocking member in a direction from the inlet to the outlet is greater than an attraction force between the first blocking member and the attraction member; the first blocking member being able to move towards the blocking position when a pressure difference between both sides of the first blocking member in a direction from the inlet to the outlet is less than an attraction force between the first blocking member and the attraction member.

In order to achieve the above purpose, the present application also provides a water heating system, comprising: a water heater; a water inlet and a water outlet which are connected to the water heater; a water inlet pipe in communication with the water inlet; a water outlet pipe in communication with the water outlet; a water return pipe of which a first end is in communication with the water inlet pipe and a second end is in communication with the water outlet pipe; the water inlet pipe, the water heater, the water outlet pipe and the water return pipe form a circulation loop; the circulation loop is provided with a circulation pump; a water mixing valve in communication with the water outlet pipe; the water mixing valve is disposed downstream the second end of the water return pipe; a constant pressure switch apparatus connected which is close to the water mixing valve and disposed on the water return pipe; the constant pressure switch apparatus including: a first body inside which a flow passage is provided, the flow passage having an inlet and an outlet; the inlet being in communication with the water outlet pipe and the outlet being in communication with the cold water pipe; a first blocking member and an attraction member that can be magnetically attracted to each other, the attraction member is located between the water outlet pipe and the inlet; the first blocking member having a blocking position and a communicating position that are spaced apart with a preset distance; the first blocking member being able to move towards the communicating position when a pressure difference between both sides of the first blocking member in a direction from the inlet to the outlet is greater than an attraction force between the first blocking member and the attraction member; the first blocking member being able to move towards the blocking position when a pressure difference between both sides of the first blocking member in a direction from the inlet to the outlet is less than an attraction force between the first blocking member and the attraction member.

By using a blocking member and an attraction member that can be magnetically attracted to each other, and by using the relationship that the size of magnetic force is negatively correlated with distance, the constant pressure switch apparatus provided in the present application enables the attraction force between the blocking member and the attraction member to reduce gradually in the process when the blocking member moves from the blocking position to the communicating position. Thus, when the blocking member moves for a preset distance to reach the communicating position, the attraction force between it and the attraction member will reduce. Although a certain pressure relief will be formed after the flow passages are communicated, the water pressure after the pressure relief can still maintain the blocking member at the communicating position. Therefore, in the present application, the circulating pump can maintain a communicated state of the flow passage without increasing the pressure, thereby forming a stable return pipeline.

Meanwhile, the blocking member in the present application can open the constant pressure switch apparatus only when it moves for a preset distance to reach the communicating position, therefore, the pressure difference between two sides of the blocking member needs to be maintained for a period of time to be greater than the attraction force between the blocking member and the attraction member. Thus, the problem of the series flow of cold and hot water caused by fluctuations of water pressures of the cold water pipeline and the hot water pipeline can be effectively avoided.

Referring to the description and figures in the following, the specific embodiments of the present invention are disclosed in detail, which have pointed out the modes in which the principles of the present invention can be employed. It should be understood that, the embodiments of the present invention is not limited correspondingly in scope. Within the scope of the spirit and clauses of the appended claims, the embodiments of the present invention include a lot of modifications, amendments and equivalents.

The features described and/or illustrated with respect to one embodiment may be used in one or more other embodiments in the same or similar manner in combination with the features in other embodiments or in substitution of the features in the other embodiments.

It should be emphasized that, the term "include/contain", when used herein, is taken to specify the presence of stated features, integers, steps or components but does not preclude the presence or addition of one or more other features, integers, steps, components.

BRIEF DESCRIPTION OF THE DRAWINGS

In order to explain more clearly the Examples in the present invention or the technical solutions in the prior art, the following will briefly introduce the figures needed in the description of the Examples or the prior art. Obviously, figures in the following description are only some Examples of the present application, and for a person skilled in the art, other figures may also be obtained based on these figures without paying creative efforts.

FIGS. 5a and 5b are schematic diagrams of a constant pressure switch apparatus provided by another embodiment of the present application;

FIGS. 6a and 6b are schematic diagrams of a constant pressure switch apparatus provided by another embodiment of the present application;

DETAILED DESCRIPTION

Figure 1:
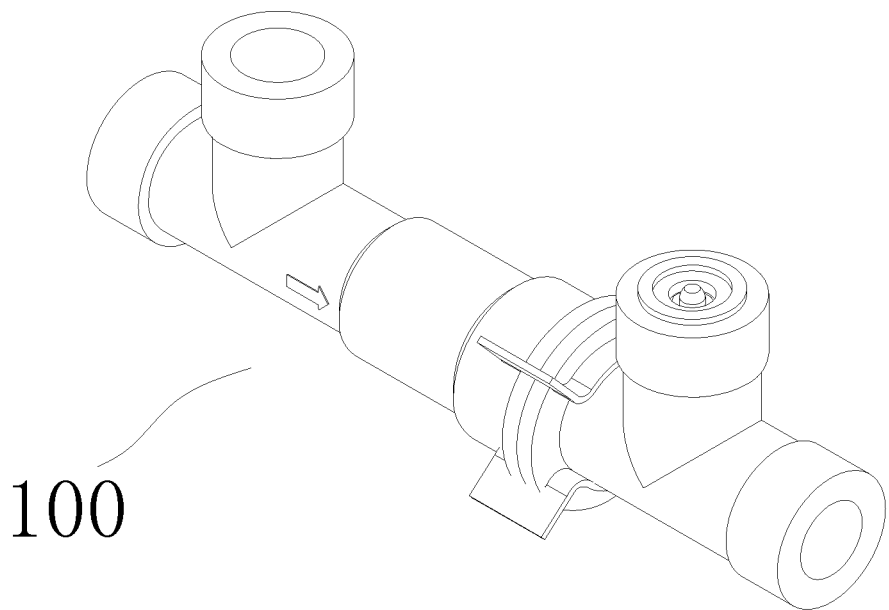
FIG. 1 is a schematic diagram of a constant pressure switch apparatus provided by one embodiment of the present application.

In order to enable the persons skilled in the art to better understand the technical solutions in this application, clear and comprehensive description will be made to the technical solutions in the embodiments of this application in the following in combination with the figures in the embodiments of this application, obviously, the embodiments described herein are only part of the embodiments of the application rather than all the embodiments of the application. Based on the embodiments of the present application, all other embodiments obtained by ordinary skilled persons in the field without paying creative efforts should pertain to the extent of protection of the present invention.

What needs to be explained is that, when an element is referred to as being "provided on" another element, it can be directly on the other element or intervening elements may also be present. When an element is considered to be "connected with" another element, it may be directly connected to the other element or intervening elements may also be present at the same time. The terms "perpendicular", "horizontal", "left" and "right" used herein and similar expressions are only for the purpose of illustration but are not intended to represent only one embodiment.

Unless otherwise defined, all technical and scientific terms used herein have the same meaning as commonly understood by those skilled in the art to which this invention belongs. The terminology used in the description of the invention herein is for the purpose of describing particular embodiments only and is not intended to limit the invention. As used herein, the term "and/or" includes any and all combinations of one or more of the associated listed items.

Referring to FIGS. 1 to 6b, the figures illustrate a constant pressure switch apparatus 100 provided by an embodiment of the present application. The constant pressure switch apparatus 100 comprises: a first body 1 inside which a flow passage 10 is provided; the flow passage 10 has an inlet 11 and an outlet 12; a first blocking member 30 and an attraction member 20 that can be magnetically attracted to each other; a first blocking member 30, the first blocking member 30 having a blocking position and a communicating position that are spaced apart with a preset distance; the first blocking member 30 being able to move towards the communicating position when a pressure difference between both sides of the first blocking member in a direction from the inlet 11 to the outlet 12 is greater than an attraction force between the first blocking member 30 and the attraction member 20; the first blocking member 30 being able to move towards the blocking position when a pressure difference between both sides of the first blocking member in a direction from the inlet 11 to the outlet 12 is less than an attraction force between the first blocking member 30 and the attraction member 20.

In use, the outlet 12 of the flow passage 10 is communicated with a cold water pipeline or a return pipeline, and the inlet 11 of the flow passage is communicated with a hot water pipeline. When the return water is not heated, the first blocking member 30 is located at the blocking position, and the flow passage 10 of the first body 1 is in a blocked state. The circulating pump is opened when the return water is heated, and based on the pressure provided by the circulating pump, the first blocking member 30 moves towards the communicating position when a pressure difference between both sides of the first blocking member 30 in a direction from the inlet 11 to the outlet 12 is greater than an attraction force between the first blocking member 30 and the attraction member 20.

Based on the magnetic suction effect between the first blocking member 30 and the attraction member 20, along with the movement of the first blocking member 30, the first blocking member 30 becomes more and more distant from the attraction member 20. Since the size of magnetic force is negatively correlated with distance, the attraction force between the first blocking member 30 and the attraction member 20 will gradually reduce. When the first blocking member 30 moves for a preset distance to reach the communicating position, the flow passage 10 is opened to communicate the circulating waterway. At this time, although a certain degree of pressure relief exists at the communicating position, since the attraction force between the first blocking member 30 and the attraction member 20 is also reduced due to the increased distance therebetween, the circulating pump can maintain the communicated state of the flow passage 10 without increasing the pressure, thereby forming a stable return pipeline. The circulating pump stops working when the heating of the return water is finished, the pressure difference between the two sides of the first blocking member 30 disappears, and the first blocking member 30 will be attracted again to the blocking position by means of the attraction force between the first blocking member 30 and the attraction member 20, and thus the cold water pipeline and the hot water pipeline are separated again.

As can be seen from the above description, by using the first blocking member 30 and the attraction member 20 that can be magnetically attracted to each other, and by using the relationship that the size of magnetic force is negatively correlated with distance, the constant pressure switch apparatus 100 provided in this embodiment enables the attraction force between the first blocking member 30 and the attraction member 20 to reduce gradually in the process when the first blocking member 30 moves from the blocking position to the communicating position. Thus, when the first blocking member moves 30 for a preset distance to reach the communicating position, the attraction force between it and the attraction member 20 will reduce. Although a certain pressure relief will be formed after the flow passage 10 is communicated, the water pressure after the pressure relief can still maintain the first blocking member 30 at the communicating position. Therefore, in this embodiment, the circulating pump can maintain a communicated state of the flow passage 10 without increasing the pressure, thereby forming a stable water return.

Meanwhile, the first blocking member 30 in this embodiment can open the constant pressure switch apparatus 100 only when it moves a preset distance to reach the communicating position, therefore, the pressure difference between the two sides of the first blocking member 30 needs to be maintained for a period of time to be greater than the attraction force between the first blocking member 30 and the attraction member 20. Thus, the problem of series flow of cold and hot water caused by fluctuations of the water pressures of the cold water pipeline and the hot water pipeline can be effectively avoided.

Figure 2:
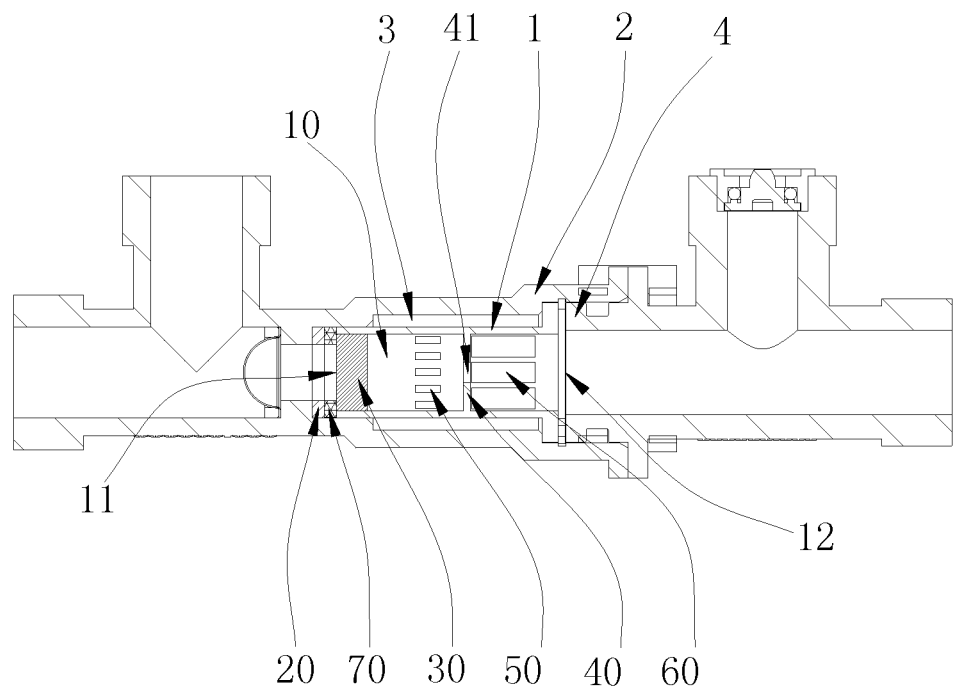
FIG. 2 is a section view of the constant pressure switch apparatus shown in FIG. 1.

Continuing to refer to FIG. 2, in the constant pressure switch apparatus 100 provided in this embodiment, when the first blocking member 30 is located at the blocking position, the attraction force between the first blocking member 30 and the attraction member 20 can serve as an open pressure for the constant pressure switch apparatus 100. As long as the pressure difference formed by pressures provided by the circulating pump is greater than the open pressure of the constant pressure switch apparatus 100, the circulating pump can stably open the constant pressure switch apparatus 100 without constantly pressurizing.

In this embodiment, the first body 1 has a plurality of forms of shapes and structures which can be matched with the shapes and constructions of the flow passage 10, so the present application will not make any limitation to this. Of course, the first body 1 can be tubular as a whole so as to be adapted to the constructions of the cold and hot water pipelines in a room. The flow passage 10 of the first body 1 has an outlet 12 and an inlet 11 between which there may be a single passage, or there may be a plurality of passages, or there may be a situation where a main passage and branches exist together. Meanwhile, the cross section of the flow passage 10 may have a lot of shapes, such a circular shape, a polygonal shape or other irregular shapes. Thus, this embodiment only needs to ensure that the flow passage 10 can allow flow of water, and this embodiment also will not make any limitation to the specific shape and construction of the flow passage 10. Besides, the material of the first body 1 is nonmagnetic material or material which is not magnetically attractable, preferably, the first body 1 may be of plastic.

In this embodiment, the first blocking member 30 and the attraction member 20 can be magnetically attracted to each other, wherein, only at least one of the first blocking member 30 and the attraction member 20 needs to have magnetism. Take a situation where the first blocking member 30 has magnetism as an example, the first blocking member 30 may be formed of a magnetic substance (material) and may also be an electromagnet, considering that there are multiple kinds of magnetic substances, there are also multiple modes in which the first blocking member 30 has magnetism. Preferably, on the basis that the magnetic attraction force is mutual, at least one of the attraction member 20 and the first blocking member 30 can be formed of a magnetic material. That is to say, the attraction member 20 and the first blocking member 30 may both be formed of magnetic materials; and the two may also be formed in such a way that only one of them is formed of a magnetic material, while the other only needs to be formed of a material that is attracted to the element made of the magnetic material, such as an iron component. Preferably, the magnetic material may be ferromagnetic material.

In this embodiment, the first blocking member 30 and the attraction member 20 may have a plurality of positions. For example, the first blocking member 30 and the attraction member 20 may be provided inside the flow passage 10 of the first body 1, may be provided outside the flow passage 10 of the first body 1, and may also be provided on a wall of the flow passage 10 of the first body 1 (as a part of the wall); of course, the first blocking member 30 and the attraction member 20 may also be set in such a way that one of them is located outside the first body 1 while the other is located inside the flow passage 10, and in such a way that one of them is located on the wall of the flow passage 10 of the first body 1 while the other is located inside/outside the first body 1, or, they may be set in other position forms. It can be seen that in this embodiment, the positions of the first blocking member 30 and the attraction member 20 can be set flexibly and have many forms, with only a need to ensure that the first blocking member 30 can block the flow passage 10 at the blocking position and can open the flow passage 10 at the communicating position. Meanwhile, since the range of action of the magnetic force is wide, the relative position between the first blocking member 30 and the attraction member 20 can also be set flexibly, for example, the first blocking member 30 and the attraction member 20 may or may not contact each other at the blocking position.

What needs to be explained is that, the first blocking member 30 and the attraction member 20 may also have a plurality of shapes, so the present application still does not make any limitation to this. For example, when the first blocking member 30 is located inside the flow passage 10, the first blocking member 30 may have a shape that is matched with the shape of the cross section of the flow passage 10, and when the attraction member 20 is located outside the first body 1, the shape of the attraction member 20 is not subjected to any limitations, with only a need of ensuring that it can attract the first blocking member 30 magnetically. Besides, when the first blocking member 30 is located outside the first body 1, the shape of the first blocking member 30 is not subjected to any limitations either, with only a need of ensuring that the first blocking member 30 blocks the flow passage 10. To be specific, the first blocking member 30 may be a plate first body, a block first body, a cover first body or other structures, and the cross section thereof may also be circular, polygonal or irregular shaped; the attraction member 20 may be annular and plate-like, and may be a block first body or other structures.

The first blocking member 30 has a blocking position and a communicating position, the blocking position and the communicating position are spaced apart with a preset distance. Under the function of the preset distance, the first blocking member 30 needs to move for the preset distance to reach the blocking position/communicating position. Meanwhile, when the first blocking member 30 moves from the communicating position to the blocking position, the distance between it and the attraction member 20 is gradually decreasing, correspondingly, when the first blocking member 30 moves from the blocking position to the communicating position, the distance between it and the attraction member 20 is gradually increasing.

The blocking position and the communicating position may be fixed positions, the first blocking member 30 blocks the flow passage 10 at the blocking position, and opens the flow passage 10 (the flow passage 10 is in a communicated state) at the communicating position. The moving process of the first blocking member 30 can be understood as a transition process from being blocked to being opened, that is, it is permitted to have slight water leakage in the moving process of the first blocking member 30, and the influence of the slight water leakage on the pressure difference between the two sides of the first blocking member 30 is very weak. The flow passage 10 is in a fully opened state when the first blocking member 30 is in the communicating position, and at this time, the pressure relief (pressure drop) is very obvious compared with the pressure relief caused by the above mentioned water leakage, meanwhile, the amount of water flow is also larger.

What needs to be explained is that, the preset distance at which the blocking position and the communicating position are spaced apart can enable the first blocking member 30 to still keep a blocked state of the flow passage 10 when the first blocking member 30 at the blocking position is slightly moved, in contrast, the blocking mechanism in the prior art will open the flow passage 10 when there is a movement. Therefore, the constant pressure switch apparatus 100 provided in this embodiment can effectively avoid the phenomenon of series flow of cold and hot water, and thus has better stability.

The blocking position and the communicating position of the first blocking member 30 may be spaced apart at a preset distance in a direction of motion of water flow in the flow passage 10. Take connection of the cold and hot water pipelines as an example, the inlet 11 of the flow passage 10 may be connected with the hot water pipeline, and the outlet 12 may be connected with the cold water pipeline, so as to adapt to the cyclic heating process of the water flow flowing from the hot water pipeline to the cold water pipeline. In other words, the blocking position may be located upstream the communicating position in the cyclic heating loop of the water heating system.

The blocking position can be provided with a stopper, so as to stop and limit the first blocking member 30 in the moving process thereof. There may be a plurality of setting manners and constructions for the stopper, so the present application will not make any limitation to this. For example, the stopper may be provided inside the flow passage 10 and may also be provided outside the flow passage 10; it may connect the first body 1 and may also not connect the first body 1 but connect other support structures. Of course, the set positions of the stopper and the first blocking member 30 need to be in a certain collaboration relationship, for example, as shown in FIGS. 5a and 5b, the first blocking member 30 slides outside the flow passage 10, at which time the stopper can be provided on an outer wall of the first body 1; or, as shown in FIGS. 6a and 6b, the first blocking member 30 is provide inside the flow passage 10, at which time the stopper can be provided on an inner wall of the first body 1.

To be specific, the first body 1 is provided with a baffle 40 adjacent to the communicating position. The first blocking member 30 stops moving when it reaches to the baffle 40. This embodiment does not make any limitation to the specific shape of the baffle 40, which may be a construction of which a cross section is circular, polygonal or irregular shaped. The position of the baffle 40 may also be provided on an outer wall of the first body 1 (outside the flow passage 10), and it may also be provided on an inner wall of the first body 1 (inside the flow passage 10), and this embodiment also does not make any limitation to this.

Figure 3:
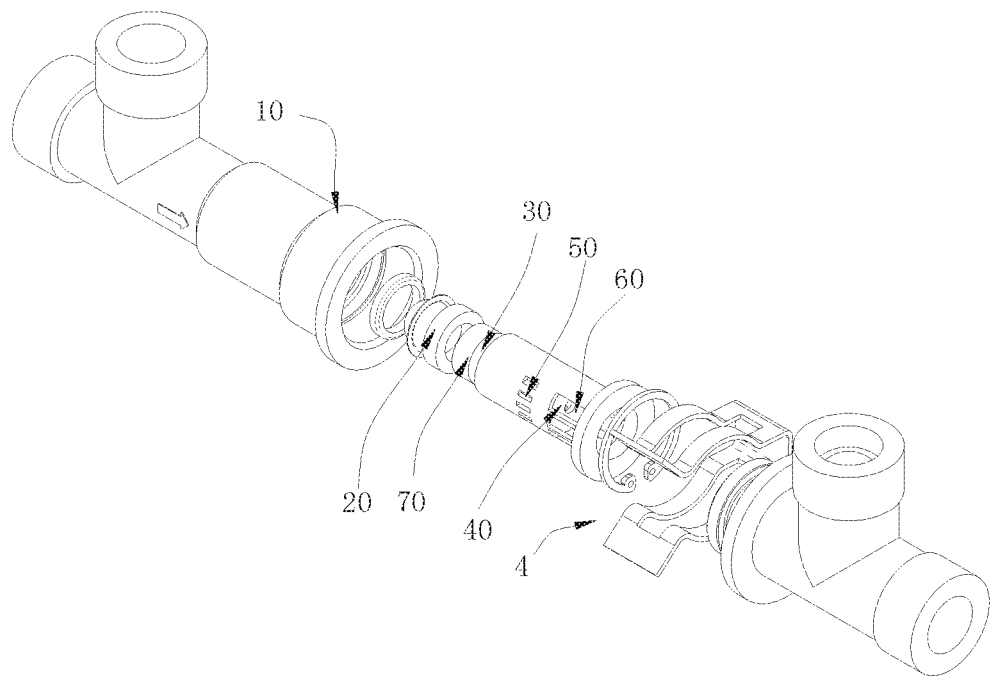
FIG. 3 is an explosive view of the constant pressure switch apparatus shown in FIG. 1.

On the constant pressure switch apparatus 100 shown in FIGS. 2 and 3, the baffle 40 may be located inside the flow passage 10. At this time, although the first blocking member 30 can slide in the flow passage 10 (of course, the first blocking member 30 may also rotate around a pivot as shown in FIGS. 6a and 6b), the shape of the cross section of the first blocking member 30 is matched with that of the flow passage 10. For example, the cross section of the flow passage 10 is circular, polygonal (such as in a square and rectangle shape) or in any other shapes, and the cross section of the first blocking member 30 is also circular, polygonal or in any other shapes.

The first blocking member 30 moves towards the baffle 40 under the impact of water flow (or under the effect of the pressure difference between the two sides thereof), and after the first blocking member 30 moves to the baffle 40, it is stopped and limited by the baffle 40 and then stops moving. The position of the baffle needs to be selected properly, it is adjacent to the communicating position, and the baffle 40 limits the first blocking member 30 to the communicating position, so as to perform the return water circulation. In consideration that if the baffle 40 is in a closed construction, the first blocking member 30 and the baffle 40 will have water remained therebetween when the first blocking member 30 moves towards the communicating position, which results in that the first blocking member 30 cannot be located completely in the communication position, therefore, the baffle 40 can be provided with a first through-hole 41. The first through-hole 41 can completely drain out the water between the baffle 40 and the first blocking member 30, so as to facilitate the first blocking member 30 to completely expose the discharge hole on the wall of the first body 1, and thus the flow passage 10 is in a fully opened state.

In order to facilitate movement of the first blocking member 30 in the flow passage 10, a certain distance may present between an outer edge of the first blocking member 30 and the flow passage 10, which distance will form slight water leakage in the moving process of the first blocking member (which has been described in the above). In order to prevent the first blocking member 30 from turning over under the impact of water flow and being unable to work normally, the first blocking member 30 can have a preset thickness in an extension direction of the flow passage 10. Based on this preset thickness, the first blocking member 30 will not turn over when moving in the flow passage 10, and thus can reach the communicating position or can return to the blocking position stably.

Continuing to refer to FIGS. 2 and 3, a side wall of the first body 1 is provided with a second through-hole 50 and a third through-hole 60 which are in communication with the flow passage 10, and the baffle 40 is located between the second through-hole 50 and the third through-hole 60. The second through-hole 50 and the third through-hole 60 are arranged in an extension direction of the flow passage 10, in other words, one of the second through-hole 50 and the third through-hole 60 is a hole from which water flow flows out, while the other one is a hole from which the water flow enters. In FIG. 2, the second through-hole 50 is the hole from which the water flow flows out, the third through-hole 60 is the hole from which the water flow enters, and the second through-hole 50 is located upstream of the third through-hole 60. Preferably, in order to drain the water flow stably and rapidly, a plurality of second through-holes 50 and third through-holes 60 are distributed evenly on the side wall of the first body 1 in a circumferential direction thereof. The present application does not make any limitation to the specific shapes of the second through-hole 50 and third through-hole 60. They may be circular holes, may be polygonal holes, and may also be irregular shaped holes.

Take the case shown in FIG. 3 as an example, the second through-hole 50 and the third through-hole 60 may both be of rectangular structures, and the sides in a water flow direction are their long sides. The width of the second through-hole 50 may be narrower so as to prevent the problem that the first blocking member 30 is easy to turn over when it is too wide. The overall area of the third through-hole 60 is larger than that of the second through-hole 50, and thus an intensity of the side at which the third through-hole 60 is located (relative to the baffle 40) is weaker than that of the side at which the second through-hole 50 is located. Thus, in some cases, the side at which the third through hole 60 is located will be deformed anterior to the side at which the second through-hole 50 is located, thereby protecting the side at which the second through-hole 50 is located, so as to achieve the purpose of extending the usage life of the whole constant pressure switch apparatus 100.

What needs to be explained is that, there are multiple discharge methods between the second through-hole 50 and the third through-hole 60, such as setting an outer pipe 2 outside to form a sealed chamber by which the second through-hole 50 and the third through-hole 60 are communicated, besides, a plurality of grooves recessed from inside to outside may be provided on the wall of the flow passage 10. It can be seen that there are multiple discharge methods between the second through-hole 50 and the third through-hole 60 in this embodiment, so the present application will not make any limitation to this. Meanwhile, this can indicate that: when the first blocking member 30 is located at the communicating position, there may be multiple modes for the communicating mechanism of the flow passage 10 of the constant pressure switch apparatus 100. The embodiments of the present application only function for schematically illustrating, and are not limitative to the present application as should be understood.

Figure 4:
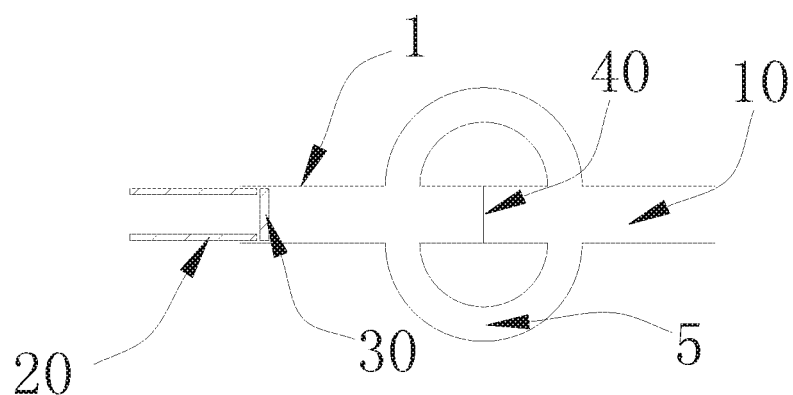
FIG. 4 is a schematic diagram of a constant pressure switch apparatus provided by another embodiment of the present application.

Besides, referring to FIG. 4, a side wall of the first body 1 is provided with a fourth through-hole and a fifth through-hole which are in communication with the flow passage 10. The communicating position is located between the fourth through-hole and the fifth through-hole. The outer wall of the first body 1 is provided with a communicating pipeline 5 which communicates the fourth through-hole with the fifth through-hole. The communicating pipeline 5 allows flow of water flowing from the fourth through-hole to the fifth through-hole, and it may be a tube in particular. Wherein, the shapes and constructions of the fourth through-hole and the fifth through-hole can be set with reference to the second through-hole 50 and the third through-hole 60 in the above, and descriptions thereof will be omitted herein.

In the above embodiment, the first body 1 of the constant pressure switch apparatus 100 may be connected with the cold and hot water pipelines. Besides, as shown in FIGS. 2 and 3, the constant pressure switch apparatus 100 may also comprise an outer pipe 2 which is provided outside the first body 1, while the attraction member 20 is provided inside the outer pipe 2 and outside the first body 1. Two ends of the outer pipe 2 are respectively connected to the cold water pipeline and the hot water pipeline, and can be set coaxially with the first body 1 (which is shown as a tubular structure in FIG. 3). To be specific, an inner wall of the outer pipe may be sealingly connected with the two ends of the first body 1 respectively, thereby forming an annulus 3 communicating the second through-hole 50 with the third through-hole 60 between the first body 1 and the outer pipe 2. When the first blocking member 30 is located at the communicating position, the circulating waterway realizes passage discharge by means of the annulus 3. The outer pipe 2 can be formed by two detachable parts as shown in FIG. 3, thereby facilitating installation of the first body 1 in the outer pipe 2. The two parts of the outer pipe 2 can both be three-way type structures, so as to provide a cold water outlet end and a hot water outlet end.

Further, the constant pressure switch apparatus 100 may also comprise a fixing member 4, the attraction member 20 is adjacent to the inlet 11, the fixing member 4 is adjacent to the outlet 12 and is capable of extending at least partially into the outer pipe 2 to fix the first body 1 in the outer pipe 2, and the blocking position includes a position where the first blocking member 30 abuts the attraction member 20. The fixing member 4 may have many constructions, such as a screw, a bolt, and a connecting pipe, and the like. Preferably, the fixing member can employ a connecting pipe to connect and fix the first body 1 and the outer pipe 2 as shown in FIG. 3. An end of the connecting pipe extends into the outer pipe 2, while the other end is in sealing contact with an end of the outlet 12 of the first body, and the two are tightly connected by a clip.

Continuing to refer to FIGS. 2 and 3, the attraction member 20 is located inside the outer pipe 2 and is located outside the first body 1, and it is in a circular construction as a whole with an outer diameter larger than the diameter of the flow passage 10. The inner wall of the outer pipe 2 is provided with steps, and the attraction member 20 can be located between an end face of the first body 1 and the steps. By means of the abutment of the top of the first body 1, the attraction member 20 can be tightly clamped between the first body 1 and the steps. The first blocking member 30 is attracted by the attraction member 20 and fits to it, and at this time, the first blocking member 30 blocks the central through-hole of the attraction member 20, thereby finishing the blocking of the flow passage 10. A gasket 70 is provided between the attraction member 20 and the first blocking member 30 and has a preset thickness. By setting this gasket 70, on the one hand, it can improve the sealing effect when the first blocking member 30 and the attraction member 20 fit each other, on the other hand, the open pressure of the constant pressure switch apparatus 100 can be controlled according to the thickness of the gasket 70.

Please refer to FIGS. 5a and 5b, which show another preferred embodiment of the present application. In this embodiment, the flow passage 10 runs through the first body 1. The constant pressure switch apparatus 100 also comprises an outer pipe 2 (not shown) which is provided outside the first body 1. The first blocking member 30 is a sleeve with one end closed and having a through-hole at a side wall, the first blocking member is sleeved at the end of the outlet 12 of the first body 1 and its side wall is located between the first body 1 and the outer pipe. When the pressure difference is greater than the attraction force between the first blocking member 30 and the attraction member 20, the through-hole 31 can be in communication with the outlet 12; when the pressure difference is less than the attraction force between the first blocking member 30 and the attraction member 20, the first blocking member 30 can block the outlet 12. In this embodiment, the first blocking member 30 may be of an annular structure, which is fixedly sleeved on the outer wall of the first body 1. The first blocking member 30, the first body 1 and the outer pipe can all be set coaxially with respect one another, and the first blocking member 30 can slide along the axis. In an opened state of the circulating pump, the first blocking member 30 is pushed by water to slide, and then communicates with the flow passage 10 after sliding for a preset distance, and therefore the water flow is discharged from the through-hole 31. After the cyclic water return and heating, the attraction member 20 attracts the first blocking member 30 to slide to the blocking position, at this time, the through-hole 31 is shielded by the wall of the first body 1, and thus the communicated state of the flow passage 10 is shut off. Of course, in this embodiment, the number of the through-hole 31 may be plural, and the through-holes 31 may also be distributed evenly in a circumferential direction of the first blocking member 30.

Please refer to FIGS. 6a and 6b, which show another feasible embodiment of the present application. In this embodiment, the flow passage 10 runs through the first body 1. At least the part of the flow passage 10 adjacent to the outlet 12 is arc shaped. The first blocking member 30 is fixed at the arc shaped flow passage 110 of the first body 1 by a positioning member and can move around the positioning member along the arc shaped flow passage 110. When the pressure difference is greater than the attraction force between the first blocking member 30 and the attraction member 20, the first blocking member 30 can move along the arc until the inlet 11 is in communication with the outlet 12; when the pressure difference is less than the attraction force between the first blocking member 30 and the attraction member 20, the first blocking member 30 can block the flow passage 10. In this embodiment, the attraction member 20 may be a stop block type construction, and is located fixedly in the flow passage 10. The first blocking member 30 may be a plate first body with one end connected on the wall of the flow passage 10 via a rotation shaft. In this embodiment, in the opening process of the flow passage 10, one end of the first blocking member 30 needs to move for a certain distance along the arc shaped flow passage 110 to open the flow passage 10, so, the constant pressure switch apparatus 100 provided in this embodiment can effectively avoid the phenomenon of series flow of cold and hot water, and thus has better stability.

It can be seen that, in the present application, the constant pressure switch apparatus 100 provides a lot of schematic and preferred embodiments to support the claims of the present application, however, it should be understood that the above embodiments should not have limitations to the present application. Any changes made by the persons skilled in the art based on the present applicant should fall into the protection scope of the present application without lacking the essence provided by the present application.

Another embodiment of the present application also provides a water heating system, comprising: a water heater having a water inlet and a water outlet; a water inlet pipe connected to the water inlet; a water outlet pipe connected to the water outlet; a cold water pipe in communication with the water inlet pipe; a water mixing valve connected between the cold water pipe and the water outlet pipe; a pump in communication with the water inlet pipe or the water outlet pipe; a constant pressure switch apparatus connected between the cold water pipe and the water outlet pipe in parallel with the water mixing valve.

The constant pressure switch apparatus comprises: a first body inside which a flow passage is provided, the flow passage having an inlet and an outlet; the inlet being in communication with the water outlet pipe and the outlet being in communication with the cold water pipe; a first blocking member and a attraction member that can be magnetically attracted to each other, the attraction member is located between the water outlet pipe and the inlet; a first blocking member, the first blocking member having a blocking position and a communicating position that are spaced apart with a preset distance; the first blocking member being able to move towards the communicating position when a pressure difference between both sides of the first blocking member in a direction from the inlet to the outlet is greater than an attraction force between the first blocking member and the attraction member; the first blocking member being able to move towards the blocking position when a pressure difference between both sides of the first blocking member in a direction from the inlet to the outlet is less than an attraction force between the first blocking member and the attraction member.

Figure 7:
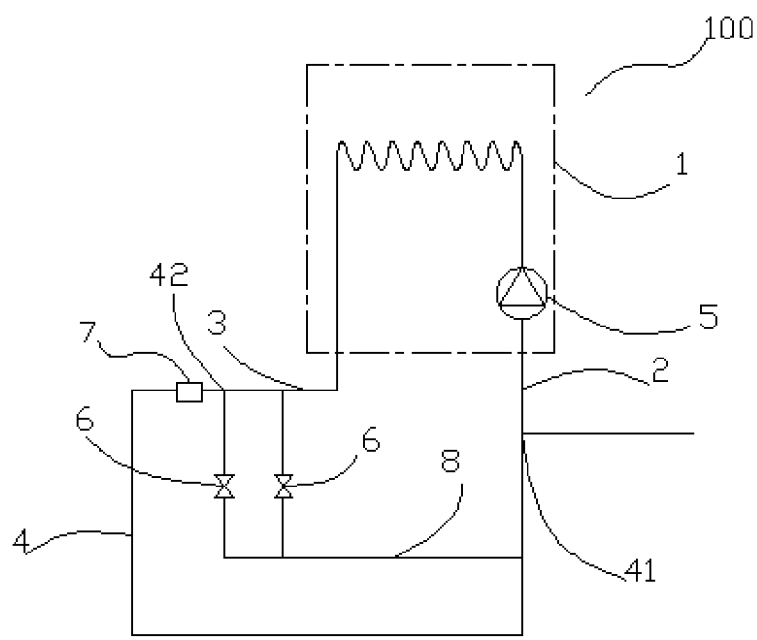
FIG. 7 is a diagram of a water heating system resetting the water return pipe of the present application.
Figure 8:
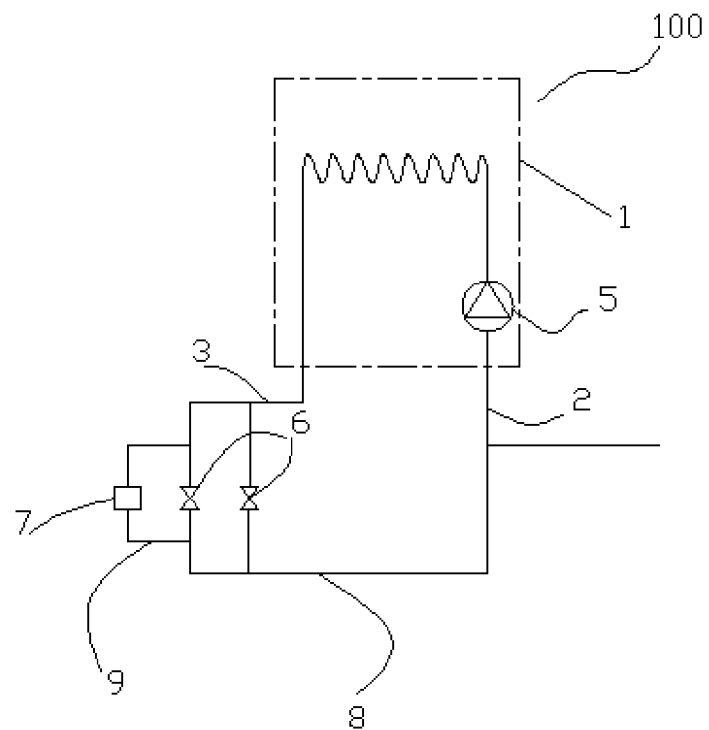
FIG. 8 is a diagram of a water heating system in which part of a cold water pipe is used as a water return pipe of the present application.

Please refer to FIGS. 7 and 8, another embodiment of this application provides a water heating system. the water heating system comprises: a water heater 1; a water inlet and a water outlet which are connected to the water heater 1; a water inlet pipe 2 in communication with the water inlet; a water outlet pipe 3 in communication with the water outlet; a water return pipe 4 of which a first end 41 is in communication with the water inlet pipe 2 and a second end 42 is in communication with the water outlet pipe 3; the water inlet pipe 2, the water heater 1, the water outlet pipe 3 and the water return pipe 4 form a circulation loop; the circulation loop is provided with a circulation pump 5; a water mixing valve 6 in communication with the water outlet pipe 3; the water mixing valve 6 is disposed downstream the second end 42 of the water return pipe 4; a constant pressure switch apparatus connected which is close to the water mixing valve 6 and disposed on the water return pipe 4.

The constant pressure switch apparatus including: a first body inside which a flow passage is provided, the flow passage having an inlet and an outlet; the inlet being in communication with the water outlet pipe and the outlet being in communication with the cold water pipe; a first blocking member and a attraction member that can be magnetically attracted to each other, the attraction member is located between the water outlet pipe and the inlet; the first blocking member having a blocking position and a communicating position that are spaced apart with a preset distance; the first blocking member being able to move towards the communicating position when a pressure difference between both sides of the first blocking member in a direction from the inlet to the outlet is greater than an attraction force between the first blocking member and the attraction member; the first blocking member being able to move towards the blocking position when a pressure difference between both sides of the first blocking member in a direction from the inlet to the outlet is less than an attraction force between the first blocking member and the attraction member.

In order to simplify the pipeline structure and reduce the usage amount of the piping material, the constant pressure switch apparatus is adjacent to the water mixing valve. The cold water and hot water are mixed by the water mixing valve and then flow out, the mixing ratio of the cold water and hot water can be controlled by the water mixing valve, and thereby the temperature of the discharged water is controlled.

In this embodiment, the shapes, constructions and acting modes of the constant pressure switch apparatus can all be set with reference to the constant pressure switch apparatus provided in the above mentioned embodiments, and descriptions thereof will be omitted.

The inventor also found the following problems when using existing water heater: the prior art disposes a water return pipe between a water outlet pipe and a water inlet pipe of the water heater, and disposes a circulation pump on a circulation loop composed of the water heater, the water outlet pipe and the water return pipe. When the user wants to use water, the circulation pump is opened in advance to drive water in the circulation loop for a circulation preheat, and draw cold water between the water consuming point and the water mixing valve back to the water heater for heating. This manner requires re-laying the water return pipe, but according to studies, most users buy the water heater after a decoration, and very few users mount the water return pipe in advance. So the technical solution that requires re-laying the water return pipe limits the popularization of the technique.

Another solution existed in the prior art to solve the above technical problem is to provide a pipeline connected in parallel with the water mixing valve of the water consuming point and disposed between the water outlet pipe and the cold water pipe supplying cold water to the water consuming point, so that the water heater, the water outlet pipe, the parallel pipeline and the cold water pipe form a circulation pipeline. This solution sufficiently utilizes the original cold water pipe in the user's house, without re-laying the water return pipe, and the construction is simple and convenient. But when the above solution is adopted, water in the cold water pipe is continuously heated during circulation after the user starts the preheat circulation function. If temperature of water in the cold water pipe is too high, water flowing out of the water mixing valve will be undesirably hot after the user opens the water mixing valve at the water consuming point.

Figure 10:
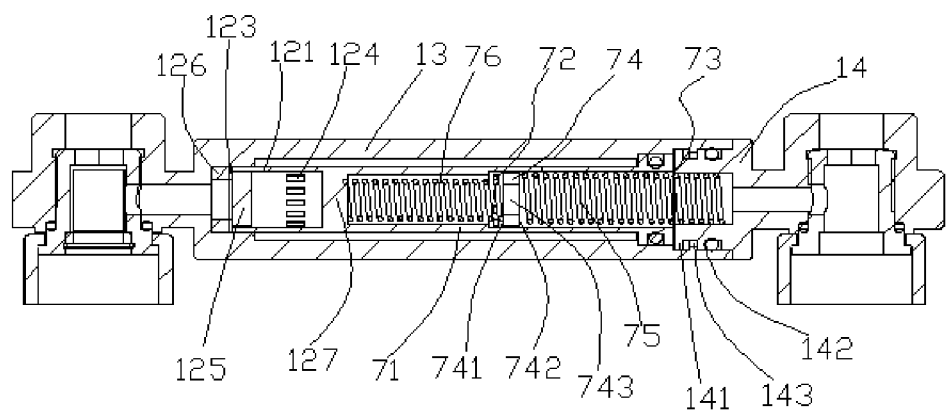
FIG. 10 is a sectional diagram of an integral structure of a temperature control part and a constant pressure switch apparatus of the present application.

In order to solve the above problem, please refer to FIGS. 7 and 10, One embodiment of this application provides a water heating system 100, this system 100 comprises: a water heater 1; a water inlet and a water outlet which are connected to the water heater 1; a water inlet pipe 2 in communication with the water inlet; a water outlet pipe 3 in communication with the water outlet; a water return pipe 4 of which a first end 41 is in communication with the water inlet pipe 2 and a second end 42 is in communication with the water outlet pipe 3; the water inlet pipe 2, the water heater 1, the water outlet pipe 3 and the water return pipe 4 form a circulation loop; the circulation loop is provided with a circulation pump 5; a water mixing valve 6 in communication with the water outlet pipe 3; the water mixing valve 6 is disposed downstream the second end 42 of the water return pipe 4; a temperature control part 7 which is close to the water mixing valve 6 and disposed on the water return pipe 4; the temperature control part 7 can cut off communication between the water outlet pipe 3 and the water return pipe 4 when temperature of water flowing through the temperature control part 7 reaches a predetermined temperature. The water heater 1 is one of a gas water heater, an electric water heater, and a heat-pump water heater. Preferably, the water heater is a gas water heater.

In a specific embodiment, the water return pipe 4 is a pipeline additionally disposed between the water outlet pipe 3 and the water inlet pipe 2; the water return pipe 4 has the first end 41 in communication with the water outlet pipe 3, and the second end 42 in communication with the water inlet pipe 2; the water return pipe 4 is provided with the temperature control part 7 that is close to the water mixing valve 6; the temperature control part 7 cuts off communication between the water outlet pipe 3 and the water return pipe 4 when temperature of water flowing through the temperature control part 7 exceeds a predetermined temperature. By disposing the temperature control part 7 in the water return pipe 4, it prevents temperature of water in the water return pipe 4 from being too high, energy resources from being wasted, and the user from suffering unnecessary loss.

In a specific embodiment, the water return pipe 4 is composed of a parallel pipeline 9 where at least part of the cold water pipe 8 and the water mixing valve 6 are connected in parallel; the cold water pipe 8 has the first end in communication with the water mixing valve 6, and the second end in communication with the water inlet pipe 2; the parallel pipeline 9 has the first end in communication with the water outlet pipe 3, and the second end in communication with the cold water pipe 8; the temperature control part 7 is disposed in the parallel pipeline 9, or the cold water pipe 8 close to the water mixing valve 6. In this embodiment, when a cold water segment between the water heater and the water consuming point is to be solved, the water return pipe 4 does not need to be re-disposed, and the temperature control part 7 is disposed in the parallel pipeline 9 composing the water return pipe 4, or the cold water pipe 8 close to the water mixing valve 6; the temperature control part 7 cuts off communication between the water outlet pipe 3 and the cold water pipe 8 when temperature of water flowing through the temperature control part 7 exceeds the predetermined temperature, so as to prevent the temperature in the cold water pipe 8 from being too high. Preferably, the temperature control part 7 is disposed on the parallel pipeline 9. If temperature of water in the cold water pipe 8 is too high, water flowing out of the water mixing valve 6 will be undesirably hot when the user starts to use water at the water consuming point.

Figure 9:
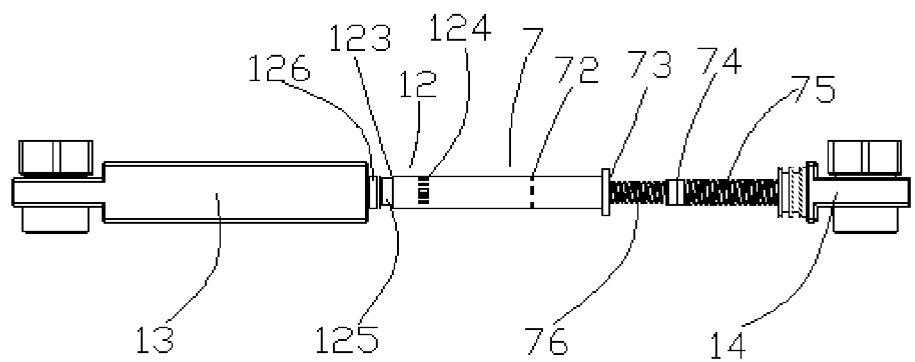
FIG. 9 is an exploded diagram of an integral structure of a temperature control part and a constant pressure switch apparatus of the present application.

Referring to FIGS. 9 and 10, the temperature control part 7 of this application comprises: a second body 71; a first inlet 72 and a first outlet 73 that are disposed on the second body 71; a second blocking member 74 that is movably disposed on the second body 71; the second blocking member 74 has a first position where the first inlet 72 can be communicated with the first outlet 73 and a second position where the first inlet 72 can be separated from the first outlet 73; a thermosensitive element 75 disposed on the second body 71 and capable of driving the second blocking member 74 to move to the second position at the predetermined temperature. Preferably, the thermosensitive element 75 is disposed downstream the first inlet 72. Further, the second body 71 is further provided with an elastic reset element 76 which applies a force toward the first position to the second blocking member 74. Specifically, the second blocking member 74 may be disposed inside or partially inside the second body 71, or partially outside the second body 71, which is not limited herein.

In a specific embodiment, the temperature control part 7 may be a first one-way valve which can be opened in a direction from the first inlet 72 to the first outlet 73. The application of the embodiment is convenient, only requiring a one-way valve having the thermosensitive element 75. When sensing that the temperature of water in the water return pipe or flowing into the cold water pipe 8 is too high, the thermosensitive element 75 drives the second blocking member 74 to block communication between the first inlet and the second inlet, and then cut off communication between the water outlet pipe 3 and the water return pipe 4, so as to prevent the temperature of water in the water return pipe 4 from continuously rising. In this embodiment, the second blocking member 74 may be a valve core.

Referring to FIGS. 9 and 10, in a specific embodiment, the second body 71 is hollow and tubular, the second blocking member 74 is disposed in the second body 71, the second blocking member 74 comprises a first surface 741, a second surface 742 and a side wall that has a predetermined thickness; the first inlet 72 is disposed on a side wall of the second body 71, one end of the second body 71 that faces the water outlet pipe 3 is at least partially sealed; the second blocking member 74 comprises a first through hole 743 which runs through the first surface 741 and the second surface 742; a first position of the second blocking member 74 is between the first inlet 72 and the first outlet 73, and when the second blocking member 74 is at the first position, the first through hole 743 communicates the first inlet 72 with the first outlet 73; when the second blocking member 74 is at a second position, the side wall of the second blocking member 74 blocks the first inlet 72. The second blocking member 74 may also be a solid construction. When the second blocking member 74 is a solid construction, the first position of the second blocking member 74 is located upstream the first inlet 72, and the second position of the second blocking member 74 is located between the first inlet 72 and the first outlet 73.

In a specific embodiment, referring to FIGS. 9 and 10, the circulation pipeline is provided with a second one-way valve which may be disposed upstream the temperature control part 7, and which may be integrated with or separated from the temperature control part 7. The second one-way valve may be an ordinary one-way valve, or a constant pressure switch valve. Preferably, the second one-way valve is a constant pressure switch valve 12. In a specific embodiment, the constant pressure switch valve 12 is disposed in the parallel pipeline 9 and located upstream the temperature control part 7. The constant pressure switch valve 12 comprises: a valve body 121 (The valve body 121 is similar to the first body structure of the constant pressure switch apparatus) which is provided with a flow channel therein; the flow channel has a second inlet 123 and a second outlet 124; a second blocking member 125 and an attraction member 126 which can be magnetically attractive to each other; the second blocking member 125 has a blocking position for partitioning the second inlet 123 from the second outlet 124 and a communicating position for communicating the second inlet 123 with the second outlet 124, which are spaced apart by a preset distance; when a difference between pressures at two sides of the second blocking member 125 in a direction from the second inlet 123 to the second outlet 124 is larger than an attractive force between the second blocking member 125 and the attraction member 126, the second blocking member 125 can move toward the communicating position; when a difference between pressures at two sides of the second blocking member 125 in a direction from the second inlet 123 to the second outlet 124 is smaller than an attractive force between the second blocking member 125 and the attraction member 126, the second blocking member 125 can move toward the blocking position. The second blocking member 125 cannot open the constant pressure switch valve 12 unless moving for a preset distance, so it is impossible to open the constant pressure switch valve 12 unless the difference between pressures at two sides of the second blocking member 125 shall be remained to be larger than the attractive force between the second blocking member 125 and the attraction member 126 for a period of time, so as to effectively avoid the problem of cross-flow of cold and hot water caused by the water pressure fluctuation in the cold water pipe 8 and the water outlet pipe 3. Specifically, the constant pressure switch valve 12 and the temperature control part 7 form an integral structure. Further, the valve body 121 and the second body 71 form an integral structure. The second outlet 124 is disposed on a side wall of the valve body 121; a baffle plate 127 is disposed between the valve body 121 and the second body 71; the second outlet 123 and the first inlet 72 are disposed at two sides of the baffle plate 127, respectively; a second through hole may be disposed in the baffle plate 127 to drain water remained between the baffle plate 127 and the second blocking member 125, so as to reduce the running resistance of the second blocking member 125. A housing 13 may be disposed outside the integral structure of the valve body 121 and the second body 71, and the housing 13 may be a part of the parallel pipeline 9; the attraction member 126 is close to the second inlet 123, and disposed in the housing 13 while located outside the valve body 121; the second blocking member 125 is disposed in the valve body 121. In order to fix the integral structure of the valve body 121 and the second body 71 in the housing 13, a fixing member 14 close to the first outlet 73 is further comprised. The fixing member 14 can at least partially extend into the housing 13 to fix the second body 71 and the valve body 121 within the housing 13, a gap is disposed between the integral structure of the second body 71 and the valve body 121 and an inner wall of the housing 13; the gap is a channel for communicating the second outlet 124 and the first inlet 72; the fixing member 14 is provided with a flow channel therein, and the first outlet 73 is in communication with the flow channel within the fixing member 14. A portion of the fixing member 14 that extends into the housing 13 is in threaded connection to the housing 13. During the implementation, the length of an integral unit composed of the housing 13 and the fixing member 14 may be adjusted through the number of turns of the threads to match the actual mounting. In addition, besides the threaded connection, other feasible embodiment includes: the portion of the fixing member 14 that extends into the housing 13 is provided with a first boss 141 and a second boss 142 that extend towards the housing 13 and are spaced by a preset distance, the second boss 142 is disposed downstream the first boss 141, the housing 13 is provided with a third boss 143 that extends toward a center of the housing 13 and has a predetermined thickness at a position of the housing 13 that is close to the first outlet 73, the third boss 143 is provided with an opening through which the first boss extends 141, the first boss 141 is rotated by a predetermined angle after extending through the opening so that the third boss 143 can be located between the first boss 141 and the second boss 142. Further, the preset distance between the first boss 141 and the second boss 142 is larger than a preset thickness of the third boss 143. Since the preset distance between the first boss 141 and the second boss 142 is larger than the preset thickness of the third boss 143, the fixing member 14 has a certain movable range, and through this movable connection mode, the purpose of adjusting the length of an integral unit composed of the housing 13 and the fixing member 14 can also be achieved.

Any numeral values cited herein includes all values of the lower values and the upper values from the lower limiting value to the upper limiting value, in increments of one unit, provided that there is a separation of at least two units between any lower value and any higher value. For example, if the value illustrating the number or process variable (such as temperature, pressure and time, etc.) of a component is from 1 to 90, preferably from 20-80, and more preferably from 30 to 70, then the purpose is to explain that the Description also explicitly enumerates values such as 15 to 85, 22 to 68, 43 to 51 and 30 to 32. For values which are less than one, one unit is considered to be 0.0001, 0.001, 0.01 or 0.1 as appropriate. These are only examples of what is specifically intended, and all possible combinations of numerical values between the lowest value and the highest value enumerated, are all expressly stated in the Description in similar ways.

Unless otherwise stated, all numerical ranges include the endpoints and all numbers that fall between the endpoints. The use of "about" or "approximately" in connection with a range applies to both ends of the range. Therefore, "about 20 to 30" is intended to cover "about 20 to about 30", inclusive of at least the specified endpoints.

All articles and reference documents, including patent applications and publications, disclosed herein are incorporated by reference. The term "substantially formed of . . . " describing combinations should include the determined elements, components, parts or steps as well as other elements, components, parts or steps that do not affect the basic novel features of the combination in substance. The use of the terms "contain" or "include" to describe the combinations of elements, components, parts or steps herein also give rise to the embodiments constituted substantially by these elements, components, parts or steps. The term "may" as used herein is intended to explain that any attribute included by the "may" as described is selectable.

Plural elements, components, parts or steps can be provided by a single integrated element, component, part or step. Alternatively, a single integrated element, component, part or step might be divided into separate plural elements, components, parts or steps. The disclosed "a" or "an" used for describing elements, components, parts or steps do not exclude other elements, components, parts or steps.

It is to be understood that the above description is intended to be graphically illustrative and not restrictive. Many embodiments and applications other than the examples provided would be apparent to those of skill in the art upon reading the above description Therefore, the scope of the present teaching should be determined not with reference to the above description but should, instead, be determined with reference to the appended claims, along with their full scope of equivalents. The disclosures of all articles and references, including patent applications and publications, are incorporated by reference for all purposes. The omission in the foregoing claims of any aspect of subject matter that is disclosed herein is not a disclaimer of such subject matter, nor should it be regarded that the inventors did not consider such subject matter to be part of the disclosed inventive subject matter.

The invention claimed is:

1. A constant pressure switch apparatus, wherein, it comprises:
a first body inside which a flow passage is provided, the flow passage having an inlet and an outlet;
a first blocking member and a sucking member configured to be magnetically attracted to each other;
the first blocking member having a blocking position and a communicating position that are spaced apart with a preset distance; the first blocking member blocks the flow passage in at least part of the preset distance to prevent flow through the flow passage; the first blocking member being able to move towards the communicating position when a pressure difference between both sides of the first blocking member in a direction from the inlet to the outlet is greater than an attraction force between the first blocking member and the sucking member;
the first blocking member being able to move towards the blocking position when a pressure difference between both sides of the first blocking member in a direction from the inlet to the outlet is less than an attraction force between the first blocking member and the sucking member.

2. The constant pressure switch apparatus according to claim 1, wherein: at least one of the sucking member and the first blocking member is made of magnetic materials.

3. The constant pressure switch apparatus according to claim 1, wherein: the first body is provided with a baffle adjacent to the communicating position, and the first blocking member stops moving when it reaches the baffle.

4. The constant pressure switch apparatus according to claim 3, wherein: the baffle is located in the flow passage and is provided with a first through-hole thereon.

5. The constant pressure switch apparatus according to claim 4, wherein: a side wall of the first body is provided with a second through-hole and a third through-hole which are in communication with the flow passage, and the baffle is located between the second through-hole and the third through-hole.

6. The constant pressure switch apparatus according to claim 5, wherein: a plurality of second through-holes and third through-holes are distributed on the side wall of the first body along a circumferential direction of the side wall.

7. The constant pressure switch apparatus according to claim 1, wherein: a side wall of the first body is provided with a fourth through-hole and a fifth through-hole which are in communication with the flow passage, and the communicating position is located between the fourth through-hole and the fifth through-hole; an outer wall of the first body is provided with a communicating pipe that communicates the fourth through-hole with the fifth through-hole.

8. The constant pressure switch apparatus according to claim 1, wherein: a cross section of the flow passage is circular, polygonal, and a cross section of the first blocking member is circular, polygonal.

9. The constant pressure switch apparatus according to claim 1, wherein: the first blocking member has a preset thickness in an extension direction of the flow passage.

10. The constant pressure switch apparatus according to claim 1, wherein: it further comprises an outer pipe that is provided outside the first body, and the sucking member is provided inside the outer pipe and outside the first body.

11. The constant pressure switch apparatus according to claim 10, wherein: it further comprises a fixing member, the sucking member is adjacent to the inlet, the fixing member is adjacent to the outlet and is configured to extend at least partially into the outer pipe to fix the first body in the outer pipe, and the blocking position includes a position where the first blocking member abuts the sucking member.

12. The constant pressure switch apparatus according to claim 11, wherein: a gasket is provided between the sucking member and the first blocking member and has a preset thickness.

13. The constant pressure switch apparatus according to claim 1, wherein: the flow passage runs through the first body; the constant pressure switch apparatus further comprises an outer pipe which is provided outside the first body, the first blocking member is a sleeve that has one end closed and is provided a through-hole on its side wall, the first blocking member is provided at the end of the outlet of the first body and its side wall is located between the first body and the outer pipe; when the pressure difference is greater than the attraction force between the first blocking member and the sucking member, the outlet is configured to be in communication with the through-hole; and when the pressure difference is less than the attraction force between the first blocking member and the sucking member, the first blocking member is configured to block the outlet.

14. The constant pressure switch apparatus according to claim 1, wherein: the flow passage runs through the first body, at least the part of the flow passage adjacent to the outlet is arc shaped, the first blocking member is fixed at the arc shaped flow passage by a positioning member and is configured to move around the positioning member along the arc shaped flow passage; when the pressure difference is greater than the attraction force between the first blocking member and the sucking member, the first blocking member is configured to move along the arc until the inlet is in communication with the outlet; when the pressure difference is less than the attraction force between the first blocking member and the sucking member, the first blocking member is configured to block the flow passage.

15. The constant pressure switch apparatus according to claim 1, further comprising: a temperature control part through which water is configured to flow and which is configured to cut off communication when temperature of water flowing through the temperature control part reaches a predetermined temperature.

16. The constant pressure switch apparatus according to claim 15, wherein: the temperature control part comprises:
   a second body;
   a first inlet and a first outlet that are disposed on the second body;
   a second blocking member that is movably disposed on the second body;
   the second blocking member has a first position where the first inlet is configured to be communicated with the first outlet and a second position where the first inlet is configured to be separated from the first outlet;
   a thermosensitive element disposed on the second body, which is configured to drive the second blocking member to move to the second position at the predetermined temperature.

17. The constant pressure switch apparatus according to claim 16, wherein: the second body is further provided with an elastic reset element which applies a force towards the first position to the second blocking member.

18. The constant pressure switch apparatus according to claim 16, wherein: the temperature control part is a first one-way valve, the one-way valve is configured to be opened in a direction from the first inlet to the first outlet.

19. The constant pressure switch apparatus according to claim 16, wherein: the second body is hollow and tubular, the second blocking member is disposed in the second body, the second blocking member comprises a first surface, a second surface and a side wall that has a predetermined thickness.

20. The constant pressure switch apparatus according to claim 19, wherein: the first inlet is disposed on a side wall of the second body, one end of the second body that is close to the first outlet is at least partially sealed;
   the second blocking member comprises a first through hole which runs through the first surface and the second surface;
   a first position of the second blocking member is between the first inlet and the first outlet, and when the second blocking member is at the first position, the first through hole communicates the first inlet with the first outlet;
   when the second blocking member is at a second position, the side wall of the second blocking member blocks the first inlet.

21. The constant pressure switch apparatus according to claim 19, wherein: the second blocking member is a solid construction, the first position of the second blocking member is located upstream the first inlet, and the second position of the second blocking member is located between the first inlet and the first outlet.

22. The constant pressure switch apparatus according to claim 16, wherein: the first blocking member and the sucking member are disposed upstream the temperature control part.

23. The constant pressure switch apparatus according to claim 22, wherein: the first body and the second body of the temperature control part form an integral structure.

24. The constant pressure switch apparatus according to claim 23, wherein, further comprising: a housing within which the first body and the second body are both disposed, the sucking member is disposed within the housing to be close to the inlet and is located outside the first body.

25. The constant pressure switch apparatus according to claim 24, wherein, further comprises a fixing member close to the first outlet, the fixing member is configured to at least partially extend into the housing to fix the second body and the first body within the housing, a gap is disposed between the second body and the first body and an inner wall of the housing, the fixing member is provided with a flow channel therein, and the first outlet is in communication with the flow channel within the fixing member.

26. The constant pressure switch apparatus according to claim 16, wherein, the thermosensitive element is disposed downstream the first inlet.

27. A water heating system, comprising: a water heater;
a water inlet and a water outlet which are connected to the water heater;
a water inlet pipe in communication with the water inlet;
a water outlet pipe in communication with the water outlet;
a water return pipe of which a first end is in communication with the water inlet pipe and a second end is in communication with the water outlet pipe;
the water inlet pipe, the water heater, the water outlet pipe and the water return pipe form a circulation loop; the circulation loop is provided with a circulation pump;
a water mixing valve in communication with the water outlet pipe; the water mixing valve is disposed downstream the second end of the water return pipe;
a constant pressure switch apparatus connected which is close to the water mixing valve and disposed on the water return pipe; the constant pressure switch apparatus including:
a first body inside which a flow passage is provided, the flow passage having an inlet and an outlet; the inlet being in communication with the water outlet pipe and the outlet being in communication with the cold water pipe;
a first blocking member and a sucking member that are configured to be magnetically attracted to each other, the sucking member is located between the water outlet pipe and the inlet;
the first blocking member having a blocking position and a communicating position that are spaced apart with a preset distance; the first blocking member being able to move towards the communicating position when a pressure difference between both sides of the first blocking member in a direction from the inlet to the outlet is greater than an attraction force between the first blocking member and the sucking member;
the first blocking member being able to move towards the blocking position when a pressure difference between both sides of the first blocking member in a direction from the inlet to the outlet is less than an attraction force between the first blocking member and the sucking member.

28. The water heating system according to claim 27, wherein, further comprising:
a temperature control part which is close to the water mixing valve and disposed on the water return pipe;
the temperature control part is configured to cut off communication between the water outlet pipe and the water return pipe when temperature of water flowing through the temperature control part reaches a predetermined temperature.

29. The water heating system according to claim 27, wherein:
the water return pipe is formed of at least part of a cold water pipe and a parallel pipeline that is connected in parallel with the water mixing valve;
a first end of the cold water pipe is in communication with the water mixing valve, and a second end thereof is in communication with the water inlet pipe;
a first end of the parallel pipeline is in communication with the water outlet pipe, a second end thereof is in communication with the cold water pipe, and the constant pressure switch apparatus is disposed in the parallel pipeline or in a cold water pipeline close to the water mixing valve.

* * * * *